(No Model.)
R. T. PALMER, Jr. & F. W. MERCER.
MACHINE FOR REWINDING CORD.
No. 538,462. Patented Apr. 30, 1895.
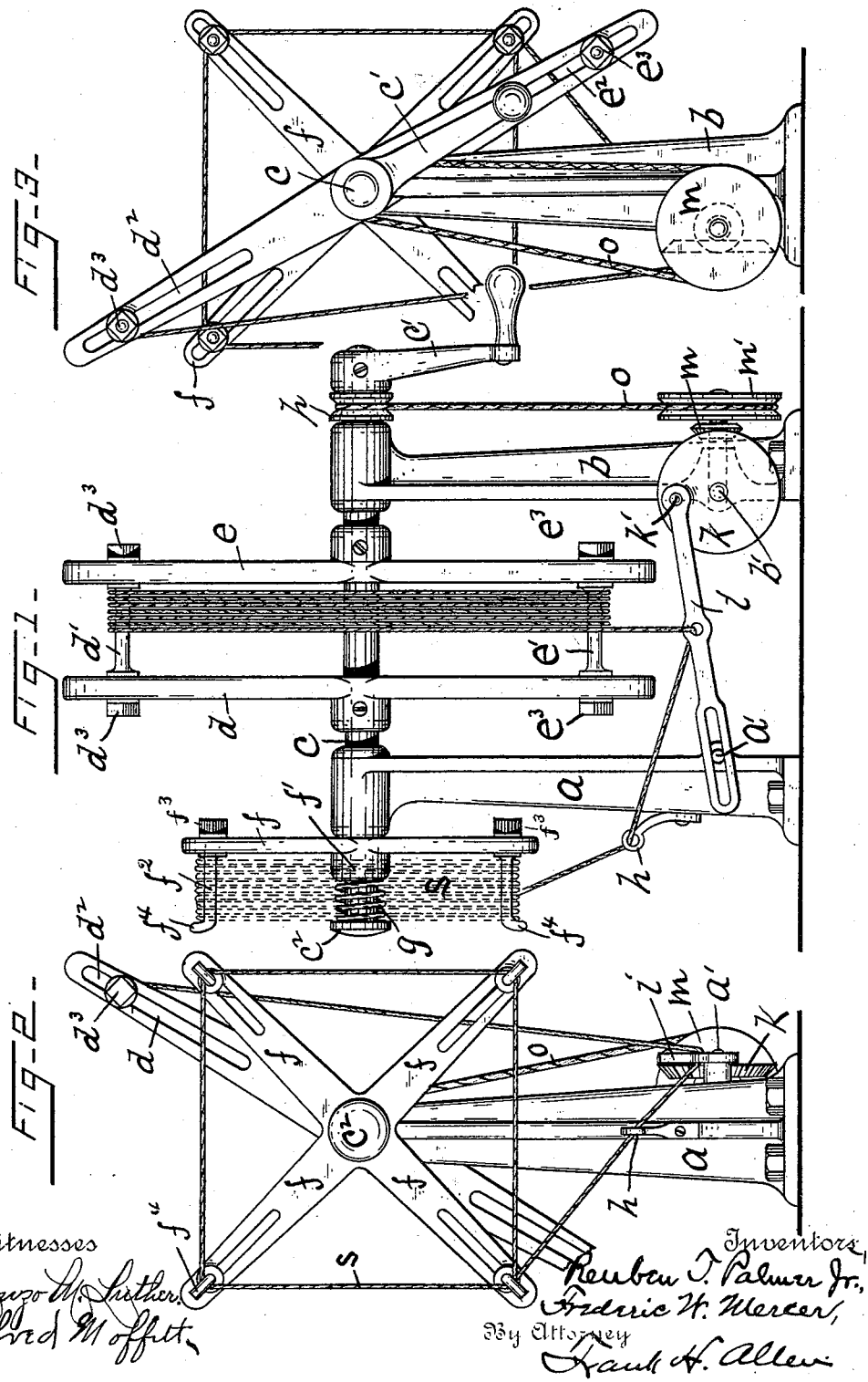

UNITED STATES PATENT OFFICE.

REUBEN T. PALMER, JR., AND FREDERIC W. MERCER, OF NEW LONDON, CONNECTICUT, ASSIGNORS TO THE R. T. PALMER COMPANY, OF SAME PLACE.

MACHINE FOR REWINDING CORD.

SPECIFICATION forming part of Letters Patent No. 538,462, dated April 30, 1895.

Application filed May 26, 1894. Serial No. 512,548. (No model.)

*To all whom it may concern:*

Be it known that we, REUBEN T. PALMER, Jr., and FREDERIC W. MERCER, citizens of the United States, and residents of the city of New London, and county of New London, and State of Connecticut, have invented certain new and useful Improvements in Machines for Rewinding Cord, which improvements are fully set forth and described in the following specification, reference being had to the accompanying sheet of drawings.

The immediate object of this invention is to provide, in compact form, and of simple construction, a machine for rewinding hanks or skeins of cord, twine or yarn to produce similar hanks or skeins of different size.

Our re-winding machine is specially valuable for use in manufacturing establishments where goods are shipped in corded bales, as, for example, in woolen mills, bed quilt mills, and the like factories. In baling goods of this class cord or rope is used in pieces of given length and, for purposes of economy, it is desirable that a supply of such cord be previously cut up. To do this expeditiously we have invented the present machine which is adapted to receive hanks of standard size and rewind the same into hanks, which, when cut apart, will furnish a supply of strands or pieces of cord each of the exact length to use without waste.

Our said machine is made adjustable so to produce different lengths of cord according to the size of bales to be bound therewith.

In order to explain our invention more readily we have provided the annexed drawings, in which—

Figure 1 is a side elevation of a rewinding-machine embodying our improvements, and Figs. 2 and 3 are end elevations of the same.

In the drawings $a$ and $b$ indicate frames or standards whose upper ends are formed as journal bearings in which is mounted a shaft $c$, having at one end an operating crank $c'$. Secured to shaft $c$ are parallel arms $d$—$e$ whose outer ends are connected by rods $d'$—$e'$ that lie in slots $d^2$—$e^2$ and are clamped in desired positions after adjustment in said slots by means of nuts $d^3$—$e^3$. The arms $d$—$e$ and rods $d'$—$e'$ form our rewinding reel and the described adjustment makes it possible to wind hanks of different sizes, to produce (after being cut) pieces of cord of greater or less length. Upon the projecting end of shaft $c$ is a reel similar to that above described but having four radial arms $f$ (instead of two) all secured to a hub $f'$ that is loosely mounted upon said shaft. Adjustably secured to each arm $f$, near its outer or free end, is a short rod or stud $f^2$ that is secured by a nut $f^3$ and is preferably formed with a bend $f^4$ to prevent the accidental disarrangement of a hank of cord when the latter is hung thereon, as best seen in Fig. 2 of the drawings. In order to prevent the last described reel from revolving too freely we have provided a frictionally acting device consisting of a strong spiral spring $g$ that is coiled around shaft $c$ and lies between hub $f'$ and a flange $c^2$ fixed upon the end of said shaft. Spring $g$ in its effort to expand, bears against hub $f'$, and the friction between the hub and the bearing being greater than that between the hub and the end of the spring will cause it to serve as a drag and thus prevent the hub, and its connected reel from running too freely.

$h$ denotes a guide eye through which the cord is passed as it leaves the last described reel which, for convenience, may be called the delivery reel.

To insure the rewinding of the cord upon the rewinding or "take-up" reel with some degree of regularity and evenness, I have provided a slowly reciprocating guide bar $i$ which is slotted at one end to ride upon a stud $a'$ projecting from standard $a$ and is connected, at its other end, with a crank pin $k'$ on the rear face of a bevel gear $k$ that is hung on a stud $b'$ projecting from frame $b$. Gear $k$ is driven by a small bevel gear $m$ that is secured to and driven by a scored pulley $m'$ which latter is driven by a belt $o$ from a scored pulley $p$ mounted upon the main shaft $a$. When said shaft is set in revolution the described pulleys, belt and gears cause the guide-bar $i$ to slowly reciprocate longitudinally, thus laying the cord upon the bars $d'$ and $e'$ with sufficient regularity.

When it is desired to use our described machine a hank $s$ (of trade size) of cord or rope is stretched upon the delivery reel. The end of said cord is passed through the guide-eye h and through the eye of the reciprocating bar i, said cord being then passed upward and secured to one of the rods d' e' of the take-up reel. Crank c' is then grasped and shaft c set in revolution when said take-up reel draws the cord from the delivery reel and rewinds it into a hank of different size, which hank is then cut through to provide a large number of pieces of cord which are not only of uniform length but are of the exact length for use in baling goods of the class referred to.

Our re-winding machine is simple, may be cheaply built and easily operated and occupies but little floor-space.

Having described our invention, we claim—

1. In a machine for rewinding cord, the combination, with supports, of a shaft journaled therein, a take-up reel rigidly secured to, and a delivery reel loosely mounted upon the shaft, an automatic drag or break for controlling the rotation of the delivery reel, and mechanism for revolving the shaft and for guiding the cord from the delivery reel to the take-up reel, substantially as set forth.

2. In a machine for rewinding cord, the combination, with supports, of a shaft journaled therein, a take-up reel rigidly secured to, and a delivery reel loosely mounted upon the shaft, a spring for engaging with the hub of the delivery reel, a screw for regulating the tension of the spring, and mechanism for revolving the shaft and for guiding the cord from the delivery reel to the take-up reel, substantially as set forth.

3. In a machine for rewinding cord, the combination, with supports, of a shaft journaled therein, a take-up reel rigidly secured to the shaft between the supports, a delivery reel loosely mounted upon the outer end of the shaft, a screw in the end of the shaft, a spring between the screw and the hub of the delivery reel, and mechanism for revolving the shaft and for guiding the cord from the delivery reel to the take-up reel, substantially as set forth.

4. In a machine for rewinding cord, the combination, with supports, of a shaft journaled therein, a take-up reel rigidly secured to, and a delivery reel loosely mounted upon the shaft, a bar provided with an eye mounted upon the supports, and adapted to guide the cord from the delivery reel to the take-up reel, and mechanism for gradually moving the bar back and forth longitudinally, and for revolving the shaft, substantially as set forth.

5. In a machine for rewinding cord, the combination, with supports, of a shaft journaled therein, a take-up reel rigidly secured to, and a delivery reel loosely mounted upon the shaft, a pulley upon one of the supports, a bar provided with an eye, one end of which bar is secured to the pulley and the other end is slotted longitudinally and mounted upon the pin, and means for revolving the shaft, substantially as set forth.

REUBEN T. PALMER, JR.
FREDERIC W. MERCER.

Witnesses:
F. E. FENGAR,
ELMER E. ROGERS.